United States Patent
Martenson et al.

(10) Patent No.: US 7,934,657 B2
(45) Date of Patent: May 3, 2011

(54) ENCODER HOME POSITION SENSING METHOD AND SYSTEM

(75) Inventors: David Douglas Martenson, Oregon City, OR (US); David L. Knierim, Wilsonville, OR (US)

(73) Assignee: Xerox Corporation, Norwalk, CT (US)

( * ) Notice: Subject to any disclaimer, the term of this patent is extended or adjusted under 35 U.S.C. 154(b) by 378 days.

(21) Appl. No.: 12/145,877

(22) Filed: Jun. 25, 2008

(65) Prior Publication Data

US 2009/0321520 A1    Dec. 31, 2009

(51) Int. Cl.
  *G02B 26/10* (2006.01)
  *G06K 7/10* (2006.01)
  *G06K 9/22* (2006.01)
  *G06K 19/06* (2006.01)
(52) U.S. Cl. .................. 235/462.25; 235/454; 235/494
(58) Field of Classification Search .................. 235/454, 235/494, 462.03, 462.25
  See application file for complete search history.

(56) References Cited

U.S. PATENT DOCUMENTS

| 5,604,345 | A | 2/1997 | Matsuura | 250/237 G |
| 6,972,403 | B2 | 12/2005 | Martenson et al. | 250/231.13 |
| 7,102,317 | B2 * | 9/2006 | Chun | 318/637 |
| 2004/0262502 | A1 | 12/2004 | Martenson et al. | 250/231.13 |
| 2005/0253052 | A1 | 11/2005 | Martenson et al. | 250/231.13 |

* cited by examiner

*Primary Examiner* — Edwyn Labaze
(74) *Attorney, Agent, or Firm* — Luis M. Ortiz; Kermit D. Lopez; Ortiz & Lopez, PLLC

(57) ABSTRACT

An encoder home position sensing system and method is disclosed, which includes the use of an analog quadrature encoder reader and either a code wheel or a code strip. The code wheel possesses an optical track comprised of annular ring patterns, the thickness of which can be modulated by a sinusoidal function about the code wheel circumference, with one cycle of a sine wave corresponding to one encoder cycle. In one region of the optical track the amplitude of the sine function is changed to imbed an absolute reference home position. This region of the optical track can be sensed and used to determine an absolute system position. The linear code strip is similarly constructed with lines along the direction of motion, the thickness of which are modulated with a sine function, with one cycle of the sine wave corresponding to one encoder cycle, and the amplitude of the sine wave function changed to imbed an absolute reference home position in the optical track.

20 Claims, 3 Drawing Sheets

ENCODER HOME POSITION SENSING METHOD AND SYSTEM

TECHNICAL FIELD

Embodiments are generally related to rendering devices and techniques. Embodiments are also related to incremental position encoders. Embodiments are additionally related to methods and systems for sensing encoder home position.

BACKGROUND OF THE INVENTION

Rendering devices such as printers, copiers and the like, can employ incremental encoders to track the position of moving components such as print drums, rotating shafts, and print heads. The position or angle of these moving components is typically controlled by a drive mechanism and measured by the encoder. The incremental encoder typically includes a movable code wheel or code strip, with an optical track comprised of alternating transparent and opaque bars, that passes between and moves relative to an illumination source, typically a light emitting diode (LED) and sensor array composed of a plurality of photosensitive elements usually photodiodes.

As the code wheel/strip moves, it interrupts the light from the illumination source causing an alternating series of light and shadow to pass across the sensor array producing electric signals that vary in amplitude. Circuitry in the encoder reader amplifies the signals to produce two output signals in quadrature, phase-A and phase-B, which is phase shifted from phase-A by 90 electrical degrees. As the code wheel/strip moves, this quadrature signal varies in frequency proportional to the speed of motion, and the phase relationship between phase-A and phase-B indicates the direction of motion.

Since the system was powered-up or reset, the basic incremental reader determined two outputs that are in quadrature only relative angle or position, but not an absolute position. An additional method must be provided to determine an absolute reference position after power-up or reset. In the case of linear motion (code strip), stalling the drive mechanism into a mechanical hard stop is a common method for generating an absolute reference position (also called a "home" position). The incremental quadrature encoder is then utilized to measure position changes relative to this reference position.

Encoders measuring the angular position of a shaft typically need a different method for establishing an absolute reference (home) position, as a mechanical stop is more difficult to implement on a rotating shaft. The common solution is a third encoder sensor output reading a second optical track on the code wheel at a different radius than the primary optical track. Such second optical tracks can consist of a single dark or pattern of dark and light bars at the reference (home) position. This third encoder sensor output is also utilized in linear (code strip) applications where mechanical stalling is not desirable. The third channel technique adds the cost of a third sense channel to the encoder reader and it's associated cabling. Based on the foregoing it is believed that a need exists for improved system and method for sensing encoder home position.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved rendering device.

It is another aspect of the present invention to provide for improved method and system for sensing a home position in an incremental encoder adapted for use with a rendering device.

It is a further aspect of the present invention to provide for an improved code wheel with an annular ring pattern for use in association with an encoder mechanism utilized in the context of a rendering device.

It is another aspect of the present invention to provide for an improved linear code strip with modulated thickness lines disposed along a direction of motion for use in association with an encoder mechanism utilized in the context of a rendering device.

The aforementioned aspects and other objectives and advantages can now be achieved as described herein. An encoder home position sensing system and method is disclosed, which includes the use of an analog quadrature encoder reader and a code device such as, for example, a code wheel or a code strip. The code wheel possesses an optical track composed of annular ring patterns. The thickness of the annular ring patterns can be altered in a sinusoidal fashion about the code wheel, with one cycle of a sine wave corresponding to one encoder cycle. The ring thickness modulation is not limited only to modulation by a sine function and other periodic modulation functions may be used. The linear code strip is similarly constructed with lines along the direction of motion with sine wave modulated thickness, with one cycle of the sine wave corresponding to one encoder cycle. The annular ring patterns reduce distortion in the sine wave encoder reader outputs, which leads to more accurate position interpolation. Additionally, a home position is imbedded in the optical track by means of changing the amplitude of the ring/line modulation function. The amplitude of the output signals change in response to the home region of the code wheel/strip optical track passing through the encoder reader. This amplitude change can be detected by an appropriate algorithm and is interpreted as the home position of the code wheel or code strip.

Code wheel or code strips that have optical tracks with such annular ring/line patterns, combined with the sine wave amplitude change within the home region, allow a low-cost two-channel analog quadrature encoder reader to provide both accurate position interpolation and home position indication, without the need for a third encoder channel nor any mechanical stalling to find a reference home position.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
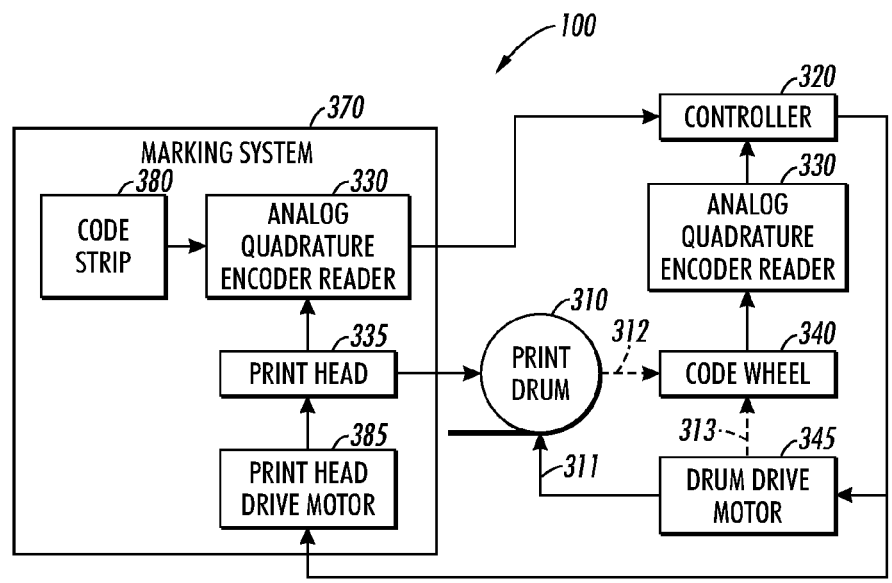
FIG. 1 illustrates a block diagram of a printing apparatus, which can be implemented in accordance with a preferred embodiment.

The particular values and configurations discussed in these non-limiting examples can be varied and are cited merely to illustrate at least one embodiment and are not intended to limit the scope thereof. Note that in FIGS. 1-5, identical or similar blocks are generally indicated by identical reference numerals.

It can be appreciated that the printing apparatus 100 may form a part of a rendering device or system such as, for example, a copier, printer, fax machine, etc. As depicted in FIG. 1, a marking system 370 can be utilized to apply marking material to the print drum 310 to form an image that is transferred to a print output medium. The marking system 370 may be, for example, an ink jet marking system or an electro photographic marking system that utilizes an optical encoder system. The printing apparatus 100 generally includes the use of a code device, such as a code wheel 340, to sense an angular position and velocity of a print drum 310. Printing apparatus 100 may also incorporate the use of a code device, such as, for example, a linear code strip 380 to sense the linear position and the velocity of a print head 335. Note that the code wheel 340 is an example of one type of a code device that can be implemented in accordance with the present invention. The code strip 380 represents an example of another type of code device that can be utilized in lieu of or in addition to the code wheel 340.

The code strip 380 is stationary and is capable of being coupled to an analog quadrature encoder reader 330 mounted to the print head 335. The linear code strip 380 can be utilized on the print head 335 within the marking system 370, or potentially on some other linearly moving device such as a scan bar within, for example, a scanner or copier, to sense linear position and velocity. The code strip 380 can be utilized to monitor the motion of the print head 335, thereby providing position related data that can be processed by a printer controller 320 to determine the linear position of the print head 335. The print head 335 can be mechanically coupled to a print head drive motor 385 utilizing belt(s) and pulleys or gears or other suitable components.

As an illustrative example, the optical encoder system for the drum depicted in FIG. 1 can be configured to include the use of code wheel 340 and an analog quadrature optical encoder reader 330 that move relative to each other pursuant to the movement of the print drum 310, thereby providing position information that can be processed by the printer controller 320 to determine angular position of the print drum 310. The code wheel 340 can be mechanically coupled to the print drum 310 as indicated by dashed line 312, and/or optionally to the drum drive motor 345 as indicated by dashed line 313. The drum drive motor 345 is mechanically coupled to the print drum 310 as indicated by line 311 using belt(s) and pulleys or gears or other suitable mechanism.

The code wheel 340 and the code strip 380 include an optical track which imbedded a home position region that is used to identify a predetermined position of the print drum 310 and the print head 335 respectively. The optical track can generally comprise light and dark regions or areas, wherein the light areas can be reflective or transmissive. In a transmissive system, the light areas would be transmissive while the dark areas would be less transmissive than the light areas. In a reflective system, the light areas would be reflective while the dark areas would be less reflective than the light areas For convenience, since the optical tracks disclosed herein can include areas of relative lightness or darkness, when an area is described as being lighter than another area, the lighter area is configured to be more transmissive in a transmissive system or more reflective in a reflective system. Similarly, when an area is described as being darker than another area, the darker area is configured to be less transmissive in a transmissive system or less reflective in a reflective system.

The analog quadrature optical encoder reader 330 can include a light source or emitter such as an LED, a lens to collimate the light, and a plurality of photosensitive detectors such as photodiodes for detecting the pattern of light transmitted or reflected by the optical track of the code wheel 340 or the code strip 380 as it moves through a sense region. The optical track of the code wheel 340 or the code strip 380 modulates the light provided by the light source, and the quadrature optical encoder reader 330 senses the light and dark areas of the optical track by detecting the modulated light provided by the optical track. The output of the analog quadrature optical encoder reader 330 can comprise quadrature waveforms that can be provided to the controller 320 to control the operation of the print head drive motor 385 and drum drive motor 345.

Figure 2:
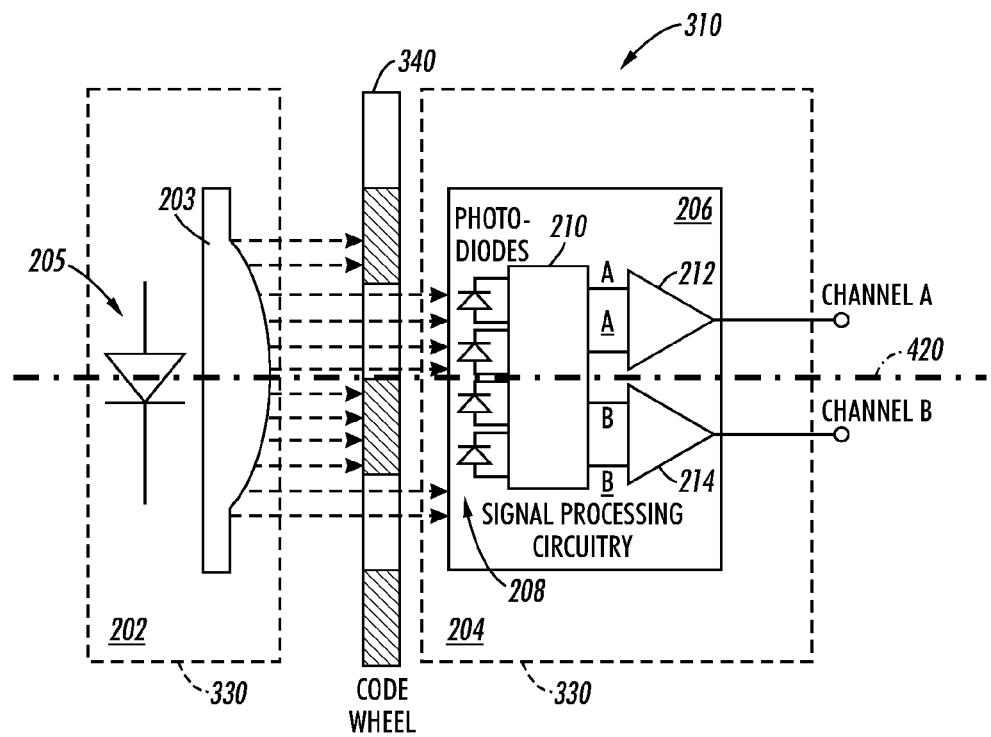
FIG. 2 illustrates a schematic diagram depicting an optical encoder that includes the use of a code wheel and an encoder reader, in accordance with an alternative embodiment.

FIG. 2 illustrates a schematic diagram depicting an optical encoder that includes the use of a code wheel and an encoder reader. FIG. 2 depicts a code wheel 340 with respect to an analog quadrature encoder reader 330 composed of an emitter section 202 and a detector section 204. The detector section 204 includes a photosensitive array comprised of a plurality of photodiodes 208 and associated signal processing circuitry composed of electrical components 210 and amplifiers 212 and 214. The code wheel 340 is generally located between the emitter section 202 and the detector section 204, wherein the emitter section includes a lens 203 and an LED 205. Note that in the configuration depicted in FIG. 2, the code wheel axis of rotation 420 is out of plane with respect to the page, either away or toward the viewer.

Figure 3:
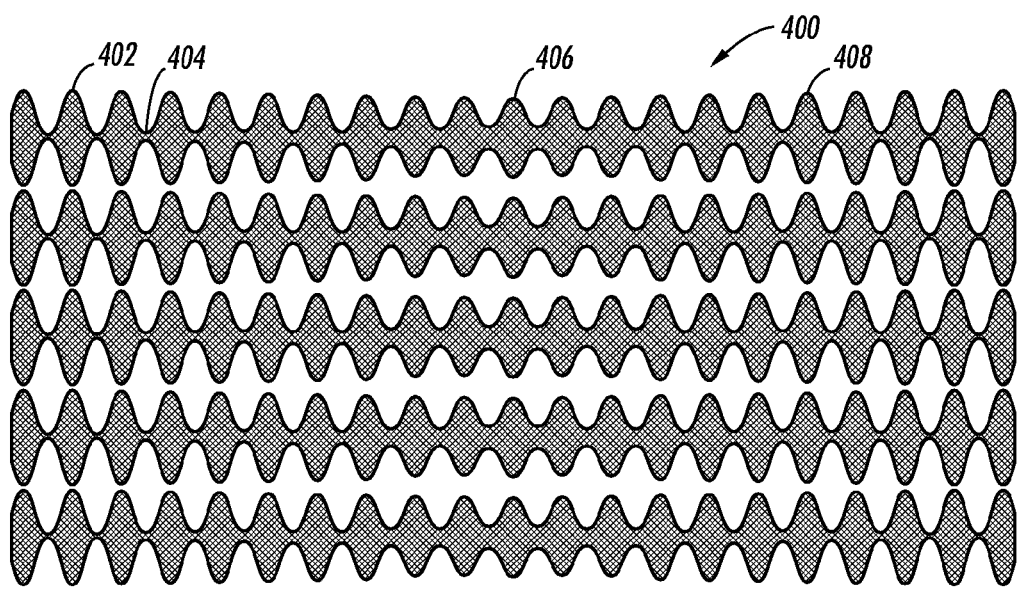
FIG. 3 illustrates a schematic view of a linear code strip optical track that includes sine wave modulated thickness lines, in accordance with an alternative embodiment.

FIG. 3 illustrates a schematic view of a linear code strip optical track 400 that includes longitudinal line patterns 408 along the direction of motion with sine wave modulated thickness function, in accordance with an alternative embodiment. (Note that the longitudinal line patterns 408 disposed on the code strip optical track 400 can also be viewed as a zoomed-in portion of the annular ring patterns 508 of the code wheel 500 such that the curvature of the annular ring patterns 508 is not visible, in accordance with an alternative embodiment.) The longitudinal line patterns 408 preferably possess different thickness such as height 402 and 404 that can be a sine wave function of distance along the code strip 400. The amplitude of the sine wave function changes within a home sense region 406 of the linear code strip optical track 400. As an illustrative example, one method of encoding the home position in the optical track is to smoothly reduced the amplitude of the sine wave function to some minimum value and then smoothly increase it back to the original amplitude. Code strip optical track 400 thus constitutes an improved linear code strip with sine wave modulated thickness lines disposed along a direction of motion, with one cycle of the sine wave corresponding to one encoder cycle for use in association with an encoder mechanism such as, for example, quadrature encoder reader 330 utilized in the context of a rendering device.

Figure 4:
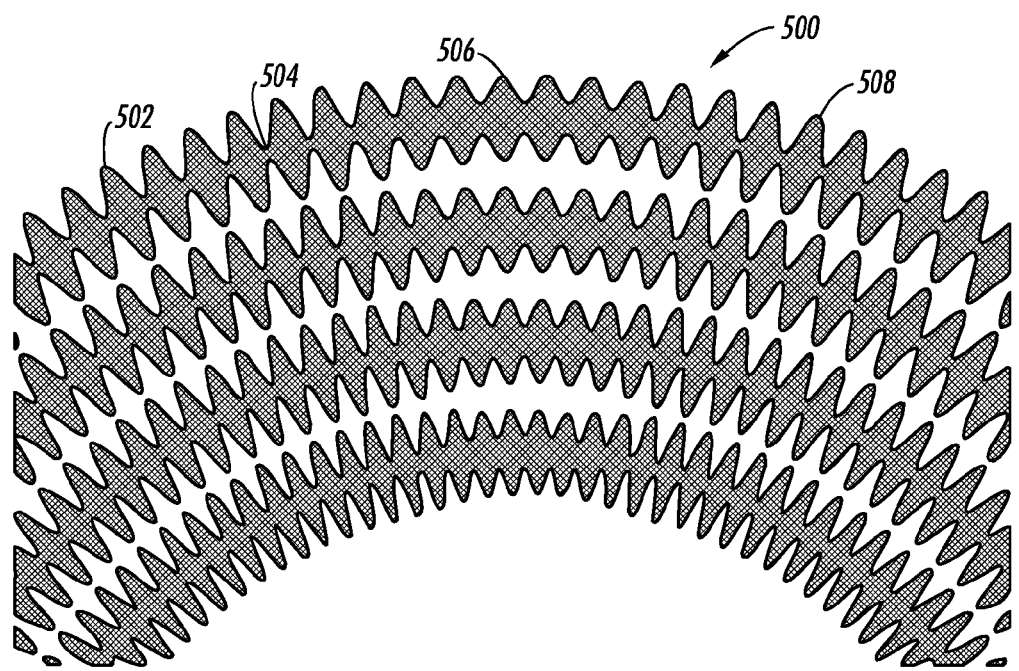
FIG. 4 illustrates a schematic view of a code wheel optical track with sine wave modulated annular ring patterns, in accordance with a preferred embodiment.

FIG. 4 illustrates a schematic view of a code wheel optical track 500 with annular ring patterns 508, in accordance with a preferred embodiment. The foregoing concepts regarding the optical characteristics of the annular ring pattern 508 can be implemented in an encoder code wheel or disc 500 similar to that of code wheel 340. The optical track 500 can be employed, for example, to detect the position of the rotatable print drum 310 disclosed earlier. The amplitude of the resulting signal from the analog quadrature encoder reader 330 will change within the home position of the print drum 310. The annular ring pattern 508 depicted in FIG. 4 preferably possess different thickness (i.e., radial height) such as height 502 and 504 that can be a sine wave function of angular position around the code wheel 500. The amplitude of the sine wave function changes within a home region 506 of the annular ring patterns 508 of code wheel optical track 500.

Figure 5:
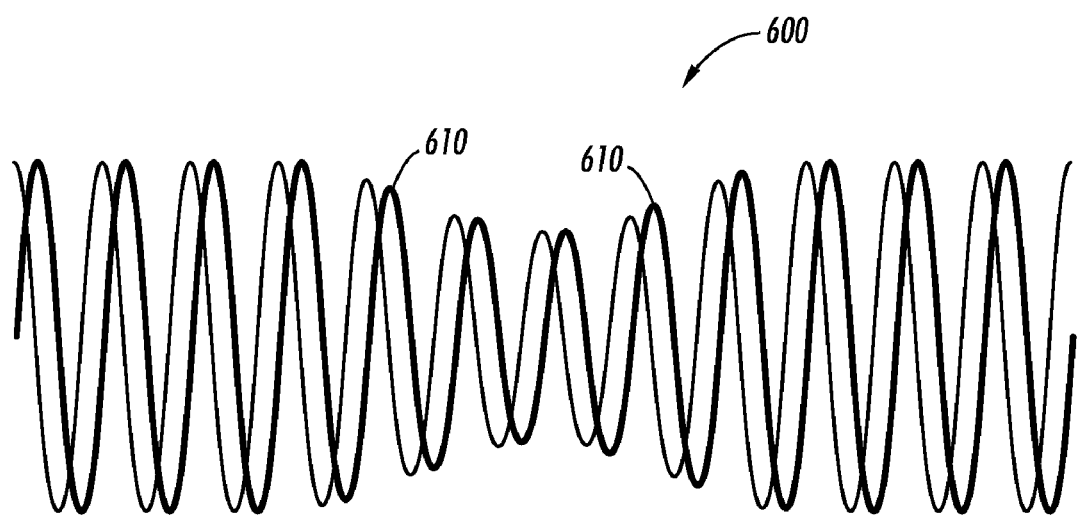
FIG. 5 illustrates a schematic representation of a quadrature waveform of the incremental quadrature encoder reader, in accordance with a preferred embodiment.

The quadrature waveform 600 shown in FIG. 5 can be generated from the optical track with the longitudinal line patterns 408 or the annular ring patterns 508, in accordance with a preferred embodiment. The quadrature waveforms 600 can be generated as the optical track with the longitudinal line patterns 408 or the annular ring patterns 508 moves between the emitter and the detectors of the analog optical encoder reader 330. As the home region 406 of the longitudinal line patterns 408 of the code strip 400 or the home region 506 of the annular ring pattern 508 of the code wheel 500 passes through analog encoder reader 330, it causes a reduction in the quadrature signal amplitude 610 produced by the analog encoder reader 330.

As an illustrative example, as part of a printer apparatus 100 a code wheel 500 can be coupled to a print drum 310 that is rotated by a drum drive motor 345. As part of an initialization routine the printer controller 320 commands the drum drive motor to rotate the print drum and code wheel. The code wheel rotates passing the optical track through the encoder reader producing a quadrature signal that is inputted by the controller 320. As the home region 506 passes through the encoder reader the quadrature signal amplitude drops in response 610. An algorithm in the controller tracks the quadrature signal 600 amplitude and also detects the minimum signal amplitude. Once the controller has found the minimum amplitude home position it can track the incremental position changes of the print drum and keep track of the print drum position relative to the home position.

The home region 506 encodes the home position in the optical track by changing the amplitude of the sine wave thickness function of the annular ring patterns 508 of the optical track 500. As an illustrative example, the amplitude of the sine wave thickness function can be reduced within the home region 406 and 506 of the code strip 400 or the code wheel 500. The amplitude is 90% for most of the length of the code strip 400 or circumference of the code wheel 340, which makes the thinnest portion 504 of the annular ring pattern 508 with 10% of its average thickness, and makes the thickest portion 502 with 190% of its average thickness (10% away from touching the next ring). For example, if X is the average thickness of the annular ring patterns 508, the instantaneous thickness T for the major part of annular rings 508 of the code wheel 500 can be calculated, as shown in equation (1) as follows:

$$T = X*(1.0 + 90\%*\sin(\text{Cycles per revolution} * \text{Angle around code wheel}) \quad (1)$$

The 90% amplitude can be smoothly reduced, for example, to 54% within the home position 406 and 506 and then smoothly increased back to 90%. Such a reduction from 90% to 54% can occur over 30 sine wave cycles, followed by 14 cycles of 54% amplitude, followed by 30 cycles where the amplitude increases back to 90% again. The specific values such as 90%, 54%, 30 cycles, and 14 cycles are described for purposes of clarity and specificity; however, such parameters should not be interpreted as a limiting feature of the present invention. It will be apparent to those of skilled in the art that other specifications are possible as desired without departing from the scope of the invention.

The sine wave modulated thickness annular ring patterns 508 can be utilized on the code wheel 500, or sine wave modulated thickness line patterns 408 utilized on a linear code strip 400, instead of traditional opaque and transparent bars in order to produce a more pure (less distorted) sine wave signal on the outputs of the encoder reader 330. It is believed that the encoder home position sensing by changing the amplitude of the sine wave thickness function of the annular ring patterns 508 in the code wheel 500 and the sine wave modulated thickness lines 408 in the code strip 400 can eliminate the cost of a third sense channel to the encoder reader 330 and its associated cabling. Also, the annular ring pattern 508 and the longitudinal line patterns 408 reduces distortion in the sine wave reader outputs, which can lead to a more accurate position interpolation, and the amplitude can be more consistent even with code wheel placement errors within the reader.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for sensing an encoder home position, comprising:
   providing a code device having an optical track comprising a plurality of patterns with sine wave modulated height and an imbedded home position region, wherein said code device moves with one cycle of a sine wave corresponding to one encoder cycle; and
   monitoring said code device utilizing a quadrature encoder reader and generating quadrature signals wherein said quadrature encoder reader generates reduced amplitude quadrature signals upon detection of said imbedded home position region.

2. The method of claim 1 wherein said code device comprises a code wheel associated with a plurality of annular ring patterns.

3. The method of claim 2 wherein said quadrature encoder reader includes at least two analog outputs, wherein said at least two analog outputs possesses a reduced distortion due to a sinusoidal height function of said plurality of annular ring patterns.

4. The method of claim 1 wherein said code device comprises a code strip associated with a plurality of longitudinal line patterns.

5. The method of claim 4 wherein said quadrature encoder reader includes at least two analog outputs, wherein said at least two analog outputs possesses a reduced distortion due to a sinusoidal height function of said plurality of longitudinal line patterns.

6. The method of claim 1 wherein said sine wave modulated height of said plurality of patterns produce a less distorted sine wave signal on said quadrature encoder reader outputs thereby providing data indicative of an accurate position interpolation and a home position.

7. The method of claim 1 wherein said quadrature encoder reader comprises a light source in association with an optical sensor.

8. A method for sensing an encoder home position, comprising:
   altering a thickness of a plurality of patterns associated with a code device in a sinusoidal fashion through said code device, wherein said code device comprises a an optical track comprising a plurality of patterns with sine wave modulated height and an imbedded home position region; and
   monitoring said code device utilizing a quadrature encoder reader and generating quadrature signals wherein said quadrature encoder reader generates reduced amplitude quadrature signals upon detection of said imbedded home position region.

9. A method for sensing an encoder home position, comprising:
   altering a thickness of a plurality of patterns associated with a code device in a sinusoidal fashion through said code device, wherein said code device comprises a code strip having an imbedded home position region, wherein said code strip moves with one cycle of a sine wave corresponding to one encoder cycle, said code strip associated with a plurality of longitudinal lines; and
   monitoring said code device utilizing a quadrature encoder reader and generating quadrature signals wherein said quadrature encoder reader generates reduced amplitude quadrature signals upon detection of said imbedded home position region.

10. A system for sensing an encoder home position, comprising:
   a code device having an optical track comprising a plurality of patterns with sine wave modulated height and an imbedded home position region to identify a position of a print head or print drum wherein said code device moves with one cycle of a sine wave corresponding to one encoder cycle;
   a quadrature encoder reader for monitoring said code device and generating quadrature signals wherein said quadrature encoder reader generates reduced amplitude quadrature signals upon detection of said imbedded home position region; and
   a controller for receiving said quadrature waveforms to control operation of said print head or print drum.

11. The system of claim 10 wherein said code device comprises a code wheel associated with a plurality of annular ring patterns.

12. The system of claim 11 wherein said quadrature encoder reader includes at least two analog outputs, wherein said at least two analog outputs possess a reduced distortion due to a sinusoidal height function of said plurality of annular ring patterns.

13. The system of claim 10 wherein said code device comprises a code strip associated with a plurality of longitudinal line patterns.

14. The system of claim 13 wherein said quadrature encoder reader includes at least two analog outputs, wherein said at least two analog outputs possess a reduced distortion due to a sinusoidal height function of said plurality of longitudinal line patterns.

15. The system of claim 10 wherein said sine wave modulated height of said plurality of patterns produce a less distorted sine wave signal on said quadrature encoder reader outputs thereby providing data indicative of an accurate position interpolation and a home position.

16. The system of claim 10 wherein said quadrature encoder reader comprises a light source in association with an optical sensor.

17. The system of claim 10 wherein said quadrature encoder reader comprises a light source in association with an optical sensor and includes at least two analog outputs, wherein said at least two analog outputs possess a reduced distortion due to a sinusoidal height function of said plurality of annular ring patterns.

18. The system of claim 10 wherein said code device comprises a code strip associated with a plurality of longitudinal line patterns and wherein said quadrature encoder reader includes at least two analog outputs, wherein said at least two analog outputs possess a reduced distortion due to a sinusoidal height function of said plurality of longitudinal line patterns.

19. The system of claim 10 wherein said code device comprises a code wheel associated with a plurality of annular ring patterns and wherein said sine wave modulated height of said plurality of patterns produces a less distorted sine wave signal with respect to said quadrature encoder reader outputs thereby providing data indicative of an accurate position interpolation and a home position.

20. The system of claim 10 wherein said code device comprises a code wheel associated with a plurality of annular ring patterns and wherein said quadrature encoder reader includes at least two analog outputs, wherein said at least two analog outputs possess a reduced distortion due to a sinusoidal height function of said plurality of annular ring patterns.

* * * * *